United States Patent Office 3,149,272
Patented Sept. 15, 1964

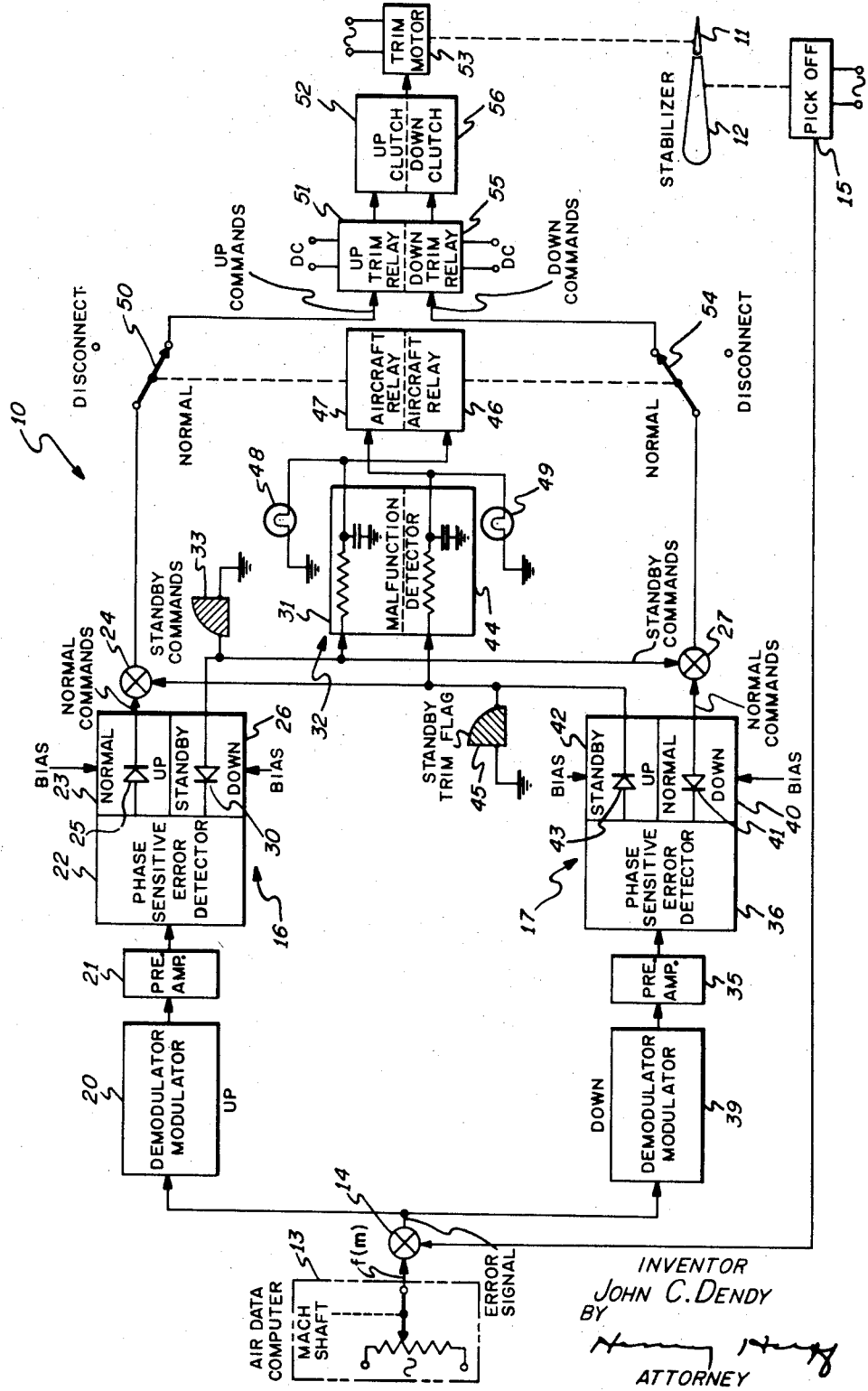

3,149,272
DISCRIMINATING SAFETY MONITOR FOR SERVO SYSTEMS
John C. Dendy, Phoenix, Ariz., assignor to Sperry Rand Corporation, Great Neck, N.Y., a corporation of Delaware
Filed Apr. 10, 1962, Ser. No. 186,528
9 Claims. (Cl. 318—28)

This invention relates to a discriminating safety monitor for servo systems. The invention is particularly applicable to monitoring aircraft control surface servo systems in order to automatically correct for the majority of failures while automatically disconnecting at least the malfunctioning portion of the system in event of those failures which could cause an immediately dangerous condition.

Existing safety monitor systems for aircraft servo systems tend to be over-complicated and unreliable. They usually consist of dummy channels, semi-redundant electronic circuits and/or comparator circuits. Nuisance tripping, i.e., unnecessary disengagement of the monitored unit due to turbulence and transient conditions, is common. Further prior art safety monitors usually provide merely for disengagement in the event of a malfunction without any provision for standby operation.

It is the primary object of the present invention to provide a discriminating safety monitor which distinguishes between a malfunction that can be automatically corrected and one that would otherwise cause a dangerous condition.

It is an additional object of the present invention to provide a discriminating safety monitor which provides standby operation for certain types of malfunctions and disengagement of the system or a portion of the system for other types of malfunctions.

It is a further object of the present invention to provide a discriminating safety monitor which is reliable, self-monitoring and requires few additional components to accomplish the monitoring function.

The above objects are achieved by a safety monitor in which an error signal is applied to first and second dual signal channels. The first signal channel has a first normal channel and a first standby channel while the second signal channel has a second normal channel and a second standby channel. The first and second normal channels pass error signals over a normal amplitude range of signals while the standby channels are biased to operate at threshold levels higher than the normal channel levels. In the event a failure of one of the normal channels renders it inoperative, the standby channel in the other of the dual channels provides a signal when the high threshold is exceeded. The signal from the standby channel then becomes the command signal and simultaneously arms malfunction detecting means in order that in the event the standby signal cannot reduce the system error to a safe value within a predetermined safe time interval, the malfunction detecting means renders at least the malfunctioning signal channel inoperative and may permit the other signal channel to continue to operate in a normal manner.

The single drawing is a wiring schematic of an aircraft servo system incorporating the present invention.

While the invention will be described with respect to a dual signal channel aircraft servo system, it will be appreciated that the invention is equally applicable to other types of dual signal channel servo systems.

Referring to the drawing, a dual signal channel aircraft servo system 10 is shown for controlling the trim tab 11 of an elevator control surface 12 in order to control the aircraft to fly at a desired Mach number. A Mach sensor 13 provides a signal having an amplitude and phase representative of the amount and direction of the deviation from the desired Mach number. The Mach sensor 13 has its output connected to one input terminal of an algebraic summation device 14. The other input terminal of the device 14 is connected to a pickoff 15 which is mechanically connected to the elevator 12 in order to provide a feedback signal representative of the position of elevator 12. The output signal from the algebraic summation device 14 is an error signal representative of the difference between the control signal from the Mach sensor 13 and the feedback signal from the pick-off 15.

The output terminal of the device 14 is connected to up and down dual command channels 16 and 17 respectively. The up channel 16 includes a demodulator-modulator quadrature-rejecting circuit 20, a preamplifier 21 and a phase-sensitive detector 22. The output terminal of the device 14 is connected to the circuit 20 which in turn is connected to the preamplifier 21 to provide an amplified error signal to the detector 22. The detector 22 is connected through a normal up "in-phase" command channel 23 to one input terminal of an up summation device 24. The normal up channel 23 includes a rectifier 25 poled to pass up command signals from the detector 22 to the summation device 24. The rectifier 25 is biased to permit up command signals to pass above a low threshold value, $e_M$, for example, respresentative of .001 Mach. The detector 22 is further connected through a standby down "out-of-phase" command channel 26 to an input terminal of a down summation device 27. The standby down channel 26 includes a rectifier 30 biased to pass down command signals in excess of a predetermined high threshold higher than that of the rectifier 25, for example, twice as high as the normal threshold error $e_M$. The standby down channel 26 is also connected to the down channel 31 of a malfunction detector device 32. To provide a visual indication to the pilot when the system is being operated through the standby down channel 26, a standby trim flag 33 is connected to the standby down channel 26.

Similarly, the down command channel 17 includes a demodulator-modulator shaping circuit 34, a preamplifier 35 and a phase sensitive detector 36. The device 14 is connected to the circuit 34 which in turn is connected to the preamplifier 35 to provide an amplified error signal to the detector 36.

The detector 36 is connected through a normal down "out-of-phase" command channel 40 to another input terminal of the summation device 27. The normal down channel 40 includes a rectifier 41 poled to pass down command signals from the detector 36 to the down summation device 27. The rectifier 41 is biased to permit down command signals to pass above said low threshold value $e_M$. The detector 36 is further connected through a standby up "in-phase" command channel 42 to another input of the up summation device 24. The standby up command channel 42 includes a rectifier 43 biased to pass up error signals in excess of said high threshold, i.e. $2e_M$. The standby up channel 42 is also connected to the up channel 44 of the malfunction detector device 32. To provide a visual indication when the system is operated through the standby up channel 42, a standby trim flag 45 is connected to the standby up channel 42. The standby down channel 31 of the malfunction detecting device 32 is connected to a down relay 46 while the standby up channel 44 is connected to an up relay 47. The standby down channel 31 is also connected to a down malfunction warning lamp 48 to provide a visual indication when the down relay 46 is energized. Similarly, the standby up channel 44 is connected to an up malfunction warning lamp 49 to provide a visual indication when the up relay 47 is energized.

The up summation device 24 is connected through an up switch 50 which is part of the up relay 47 to an up trim relay 51. The up trim relay 51 is connected to actuate an up clutch 52 and to energize a trim servomotor 53. The down summation device 27 is connected through a down switch 54 which is part of the down relay 46 to a down trim relay 55 that in turn is connected to a down clutch 56 and to energize the trim servomotor 53. The trim motor 53 drives the trim tab 11 up or down in accordance with the phase of the error signal in a manner to be explained.

In normal operation, the switches 50 and 54 are in the positions shown. When the aircraft deviates from the desired Mach number, the Mach sensor 13 generates a control signal having an amplitude and phase representative of the amount and sense of the deviation which produces an error signal having an amplitude and phase in accordance therewith.

The up and down command channels 16 and 17 respectively are identical, therefore, the error signal applied to the inputs of the command channels 16 and 17 is conducted through the circuit 20 and the preamplifier 21 as well as the circuit 34 and the preamplifier 35 and appears identically at the outputs of both the up command channel detector 22 and the down command channel detector 36. The two identical error detectors 22 and 36 are phase-sensitive. Assume "in-phase" error signals commond a nose-up attitude of the aircraft. With an "in-phase" error signal, when the amplitude of the error signal exceeds a value equivalent to an increase $e_M$ in Mach number, the low bias on the rectifier 25 is overcome. The "in-phase" error signal is then conducted through the normal up command channel 23, the up summation device 24, switch 50, and up trim relay 51 which engages the up clutch 52 and energizes the trim motor 53. The trim motor 53 drives the trim tab 11 to an elevator position necessary to reduce the error signal to a null. The high threshold bias of $2e_M$ on the rectifier 43 prevents the "in-phase" error signal from being conducted through the standby up channel 42 while the rectifiers 30 and 41 are poled to prevent passage of "in-phase" signals.

When the error signal exceeds a value equivalent to a decrease of $e_M$ in Mach number, i.e. an "out-of-phase" error signal, the low bias on the rectifier 41 is overcome. The "out-of-phase" error signal is then conducted through the normal down command channel 40, the down summation device 27, switch 54, and down trim relay 55 which engages the down clutch 56 and energizes the trim motor 53. The trim motor 53 drives the trim tab 11 in the opposite direction to an elevator position necessary to reduce the error signal to a null. The high threshold bias on the rectifier 30 prevents the "out-of-phase" error signal from being conducted through the standby down channel 26 while the rectifiers 25 and 43 are poled to prevent passage of "out-of-phase" signals.

If for any reason an improper Mach number to elevator position relationship should exist, the error signal to the command channels 16 and 17 will increase to a value greater than its normal threshold $e_M$. Assume that the down command channel 17 passively fails, e.g. an open at the input of the circuit 34, and a subsequent increase in Mach number occurs. The up command channel 16 continues to provide nose-up compensation because failure of the down command channel 17 does not interfere with operation of the up command channel 16. If the Mach number decreases after a down command channel failure, the error signal calls for nose-down compensation. The down command channel 17 cannot respond and the error signal amplitude continues to increase. When the error signal reaches approximately $2e_M$, the high threshold bias on the rectifier 30 is overcome and the "out-of-phase" error signal is conducted through the standby down channel 26 and the down summation device 27 to energize the trim motor 53 to drive in a direction to reduce the error signal to a null as explained above. During this time, the standby down trim flag 33 is positioned to provide an indication to the pilot that the system 10 is on down standby.

A failure in the up command channel 16 provides corresponding actuation of the standby up channel 42 in the down command channel 17 and by means of the up summation device 24, the "in-phase" error signal would cause the trim motor 53 to be energized to drive in the opposite direction until the error signal was nulled.

Under most conditions of passive failure, standby trim will take over the function of providing Mach trim compensation and a standby monitor flag will inform the pilot that the failure has occurred and that standby trim has taken over. If, however, an undesirable trim condition occurs before the standby trim compensates adequately for the error, the malfunction detector 32 disengages the malfunctioning channel of the system 10 and illuminates the particular malfunction warning light.

A timing circuit, such as an R–C circuit, in the malfunction detector 32 may be used to determine whether or not standby trim action is properly effective. For example, if the standby trim command is not removed through normal stabilizer action within approximately 1.2 times the normal command output time duration, the malfunction detector 32 interprets this a dangerous failure and causes Mach trim disengagement. If, for example, the previously mentioned open in the down command channel 17 created an error signal that was not corrected within the time established as a criterion, the R–C circuit in the down channel 31 of the malfunction detector 32 would cause the error signal to energize the down relay 46 thereby opening the switch 54 and disconnecting the down summation device 27 from the down relay 55. It also illuminates the down malfunction warning light 48. It will be noted that disconnecting the switch 54 does not interfere with the normal operation of the up command channel 16.

If a failure of one of the command channels 16 or 17 continuously applies a voltage to one of the trim servo directional clutches 52 or 56 respectively, the resulting stabilizer position synchro feedback signal will cause corrective action through the opposite command channel of the system 10.

While the invention has been described in its preferred embodiments, it is understood that the words which have been used are words of description rather than of limitation and that changes within the purview of the appended claims may be made without departing from the true scope and spirit of the invention in its broader aspects.

What is claimed is:

1. In a discriminating safety monitor for a dual signal channel servo system,
  (1) means for generating an error signal having an amplitude and phase representative of the magnitude and sense of the system error,
  (2) first and second dual error signal channels, said first error signal channel having a first in-phase normal channel and a first out-of-phase standby channel, said second error signal channel having a second out-of-phase normal channel and a second in-phase standby channel,
  (3) first biasing means connected to said first and second normal channels for biasing said channels to pass error signals above a first predetermined amplitude over a normal range,
  (4) second biasing means connected to said first and second standby channels to bias said standby channels to pass error signals above a second predetermined amplitude higher than said first predetermined amplitude and above said normal range,
  (5) first signal summing means connected to said first in-phase normal channel and to said second in-phase standby channel for providing a first output signal in accordance with error signals from said first normal channel over said first normal range and from said second standby channel above said first predetermined amplitude to provide standby operation, (6) second signal summing means connected to said second out-of-phase normal channel and said first in-phase standby channel for providing a second output signal in accordance with error signals from said second normal channel over said first normal range and from said first standby channel above said first predetermined amplitude to provide standby operation, (7) and servo means responsive to said first and second output signals.

2. In a servo system as claimed in claim 1, further including first indicating means connected between said first standby channel and said first summing means for providing an indication of standby operation through said first standby channel, and second indicating means connected between said second standby channel and said second summing means for providing an indication of standby operation through said second standby channel.

3. In a servo system of claim 1, further including first and second malfunction detecting means responsive to said first and second standby channels respectively for rendering at least one of said error signal channels ineffective when said error signal exceeds a second predetermined condition.

4. In a servo system of claim 3, further including first and second malfunction warning indicating means connected to respective first and second malfunction detecting means for providing an indication of the inoperative channel when said error signal exceeds said second predetermined condition.

5. In a discriminating safety monitor for a dual signal channel servo system for aircraft,
  (1) means for generating an error signal having an amplitude and phase representative of the magnitude and sense of the system error,
  (2) first and second dual error signal channels, said first error signal channel having a first in-phase normal channel and a first out-of-phase standby channel, said second error signal channel having a second out-of-phase normal channel and a second in-phase standby channel,
  (3) first biasing means connected to said first and second normal channels for biasing said channels to pass error signals above a first predetermined amplitude over a normal range,
  (4) second biasing means connected to said first and second standby channels for biasing said standby channels to pass error signals above a second predetermined amplitude higher than said first predetermined amplitude and above said normal range,
  (5) first signal summing means connected to said first in-phase normal channel and to said second in-phase standby channel for providing a first output signal in accordance with error signals from said first normal channel over said first normal range and from said second standby channel above said first predetermined amplitude to provide standby operation,
  (6) second signal summing means connected to said second out-of-phase normal channel and said first in-phase standby channel for providing a second output signal in accordance with error signals from said second normal channel over said first normal range and from said first standby channel above said first predetermined amplitude to provide standby operation,
  (7) first servo means responsive to said first output signal for controlling said aircraft in a first predetermined direction,
  (8) and second servo means responsive to said second output signal for controlling said aircraft in the opposite predetermined direction.

6. In a servo system of claim 5, further including first and second malfunction detecting means responsive to said first and second standby channels respectively for rendering at least one of said servo means ineffective when said error signal exceeds a second predetermined condition.

7. In a dual signal channel servo system for aircraft having a servomotor for driving a control surface,
  (1) means for generating a command signal having an amplitude and phase representative of the magnitude and sense of the command,
  (2) first and second dual command signal channels having first and second phase sensitive detectors respectively responsive to said command signal, said first command signal channel further having a first in-phase normal channel and a first out-of-phase standby channel connected to said first detector, said second command signal channel having a second out-of-phase normal channel and a second in-phase standby channel connected to said second detector,
  (3) first biasing means connected to said first and second normal channels for biasing said channels to pass command signals above a first predetermined amplitude,
  (4) second biasing means connected to said first and second standby channels for biasing said standby channels to pass command signals above a second predetermined amplitude higher than said first predetermined amplitude,
  (5) first signal summing means connected to said first in-phase normal channel and to said second in-phase standby channel for providing a first output signal in accordance with command signals therefrom,
  (6) second signal summing means connected to said second out-of-phase normal channel and said first in-phase standby channel for providing a second output signal in accordance with command signals therefrom,
  (7) first means responsive to said first output signal for energizing said servomotor to drive said control surface in a first predetermined direction until said command signal goes to a null,
  (8) and second means responsive to said second output signal for energizing said servomotor to drive said control surface in a second predetermined direction until said command signal goes to a null.

8. In a servo system as recited in claim 7, further including first and second malfunction detecting means responsive to said first and second standby channels respectively for rendering the output signal ineffective when said output signal exceeds a predetermined condition.

9. In a servo system as recited in claim 8, further including first and second indicating means responsive to said first and second standby channels respectively for providing an indication when said system is operating on standby, and third and fourth indicating means responsive to said first and second malfunction detecting means respectively for providing an indication when the output signal exceeds said predetermined condition.

References Cited in the file of this patent
UNITED STATES PATENTS
2,894,491    Hecht _____ July 14, 1959